(12) United States Patent
Darolia

(10) Patent No.: US 6,607,611 B1
(45) Date of Patent: Aug. 19, 2003

(54) POST-DEPOSITION OXIDATION OF A NICKEL-BASE SUPERALLOY PROTECTED BY A THERMAL BARRIER COATING

(75) Inventor: Ramgopal Darolia, West Chester, OH (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/537,646

(22) Filed: Mar. 29, 2000

(51) Int. Cl.[7] .......................... C23C 10/16; C23C 10/60
(52) U.S. Cl. ...................... 148/277; 148/285; 148/527; 148/537
(58) Field of Search .................. 148/277, 285, 148/527, 537; 428/629; 427/255.31

(56) References Cited

U.S. PATENT DOCUMENTS

| | | | |
|---|---|---|---|
| 4,966,820 A | * | 10/1990 | Kojima et al. ............... 428/629 |
| 5,562,998 A | * | 10/1996 | Strangman ................... 428/629 |
| 5,716,720 A | * | 2/1998 | Murphy ....................... 148/537 |

OTHER PUBLICATIONS

*Binary Alloy Phase Diagrams*, Thaddeus B. Massalski, Editor–in–Chief, vol. 1, pp. 143–145, American Society for Metals, 1986.*

* cited by examiner

*Primary Examiner*—George Wyszomierski
(74) *Attorney, Agent, or Firm*—Gregory O. Garmong; Carmen Santa Maria; McNees Wallace & Nurick LLC

(57) ABSTRACT

A nickel-base superalloy protected by a thermal barrier-coating is prepared by depositing a bond coat layer overlying and contacting the substrate, depositing a ceramic layer overlying and contacting the bond coat layer, thereby forming a coated substrate, placing the coated substrate into a heating apparatus operating with an oxidizing atmosphere, and heating the coated substrate in the heating apparatus to a temperature of from about 1850° F. to about 2100° F., for a time of at least about 30 minutes. A layer of alpha alumina is formed on the bond coat layer, between the bond coat layer and the ceramic layer.

20 Claims, 3 Drawing Sheets

POST-DEPOSITION OXIDATION OF A NICKEL-BASE SUPERALLOY PROTECTED BY A THERMAL BARRIER COATING

This invention relates to an article made of a nickel-base superalloy, and, more particularly, to the protection of the surface of such an article with a thermal barrier coating.

BACKGROUND OF THE INVENTION

In an aircraft gas turbine (jet) engine, air is drawn into the front of the engine, compressed by a shaft-mounted compressor, and mixed with fuel. The mixture is burned, and the hot exhaust gases are passed through a turbine mounted on the same shaft. The flow of combustion gas turns the turbine by impingement against an airfoil section of the turbine blades and vanes, which turns the shaft and provides power to the compressor. The hot exhaust gases flow from the back of the engine, driving it and the aircraft forwardly.

The hotter the combustion and exhaust gases, the more efficient is the operation of the jet engine. There is thus an incentive to raise the combustion and exhaust gas temperatures. The maximum temperature of the combustion gases is normally limited by the materials used to fabricate the turbine vanes and turbine blades of the gas turbine, upon which the hot combustion gases impinge. In current engines, the turbine vanes and blades are made of nickel-based superalloys, and can operate at temperatures of up to about 1800–2100° F.

Many approaches have been used to increase the operating temperature limit and service lives of the turbine blades and vanes to their current levels. For example, the composition and processing of the base materials themselves have been improved. Cooling techniques are used, as for example providing the component with internal cooling passages through which cooling air is flowed.

In another approach, the surfaces of the turbine blades and vanes are coated with thermal barrier coatings (TBCs). The TBCs typically include an aluminum-containing bond coat that contacts the substrate, and a ceramic layer overlying the bond coat. The bond coat protects the articles against the oxidative and corrosive effects of the combustion gas, and the ceramic layer provides thermal insulation. The turbine blades and turbine vanes are thereby able to run cooler and are more resistant to environmental attack. While TBCs are operable, it has been observed that their performance is sometimes inconsistent as a result of premature cracking and other failure mechanisms. Accordingly, there is a need for an improved approach to the preparation of nickel-base superalloys with thermal barrier coatings. The present invention fulfills this need, and further provides related advantages.

BRIEF SUMMARY OF THE INVENTION

The present invention provides a technique for improving the performance of a thermal barrier coating (TBC) on a nickel-base superalloy. This improvement is achieved while using the known techniques for preparing the TBC, with a relatively inexpensive process addition. The present approach may be used with a variety of types of TBCs, without losing the otherwise beneficial aspects of these TBCs.

A method for preparing a nickel-base superalloy protected by a thermal barrier coating comprises the steps of furnishing a substrate made of a nickel-base superalloy, thereafter depositing a bond coat layer overlying and contacting the substrate, thereafter depositing a ceramic layer overlying and contacting the bond coat layer, thereby forming a coated substrate, thereafter placing the coated substrate into a heating apparatus operating with an oxidizing atmosphere, and thereafter heating the coated substrate in the heating apparatus to a temperature of from about 1850° F. to about 2100° F., for a time of at least about 30 minutes. The heating time is typically from about 30 minutes to about 12 hours. The article is thereafter placed into service.

In another embodiment, a method for preparing a nickel-base superalloy protected by a thermal barrier coating comprises the steps of furnishing a coated substrate comprising a substrate made of a nickel-base superalloy, a bond coat layer overlying and contacting the substrate, and a ceramic layer overlying and contacting the bond coat layer. The method further includes thereafter placing the coated substrate into a heating apparatus, and heating the coated substrate in the heating apparatus to a temperature sufficient to grow a layer comprising primarily, preferably entirely, alpha alumina on the bond coat layer, between the bond coat layer and the ceramic layer.

In each approach the bond coat layer may be a diffusion aluminide or an overlay coating. The ceramic layer preferably comprises yttria-stabilized zirconia, although other types of ceramics may be used. The heating apparatus may be an air furnace, a furnace operating with a partial pressure of oxygen, or a furnace using a partial vacuum.

The controlled furnace heating in an oxidizing atmosphere causes a thermally grown oxide to form on the surface of the bond coat layer, between the bond coat layer and the ceramic layer. The furnace preferably provides a partial pressure of oxygen to ensure a relatively slow, uniform growth of the thermally grown alumina. The thermally grown oxide is the stable form of alumina (aluminum oxide), alpha ($\alpha$) alumina, rather than one of the many other forms of alumina. This alpha alumina thermally grown oxide is primarily of a uniform alpha alumina type, rather than a mixture of types that may result from growth at other temperatures or by other processing methods. By contrast, prior approaches for forming the thermally grown alumina have relied upon heating during the deposition of the bond coat or the deposition of the ceramic layer, or upon heating during service of the engine. All of these operations involve heating that produces a thermally grown oxide of undefined thickness and type. The present approach provides a carefully controlled heating that results in a thermally grown oxide of uniform thickness and crystallographic structure. The present approach does not exclude heating during deposition or during service, but adds a controlled heating step after the ceramic layer is deposited but before the TBC-coated article is placed into service. The result is less variability in the final coated article that is placed into service, as well as improved service life. Further, the strength of the interface between the alpha alumina grown by the present approach and the ceramic layer of the thermal barrier coating is expected to be higher than found for other types of alumina.

The present approach results in a more uniform and higher-quality TBC-coated nickel-base superalloy article, with only the addition of a heat treatment after the ceramic layer is coated onto the article. Preferably, the alumina scale on the bond coat layer is uniformly alpha alumina. The use of this single form of alumina ensures that there will be no constrained phase transitions among a mixture of forms of alumina during the service life, leading to improved long-term stability of the TBC. Constrained phase transformations result in residual stresses within the layer, which tend to induce spallation failure. Other features and advantages of the present invention will be apparent from the following more detailed description of the preferred embodiment, taken in conjunction with the accompanying drawings, which illustrate, by way of example, the principles of the invention. The scope of the invention is not, however, limited to this preferred embodiment.

DETAILED DESCRIPTION OF THE INVENTION

Figure 1:
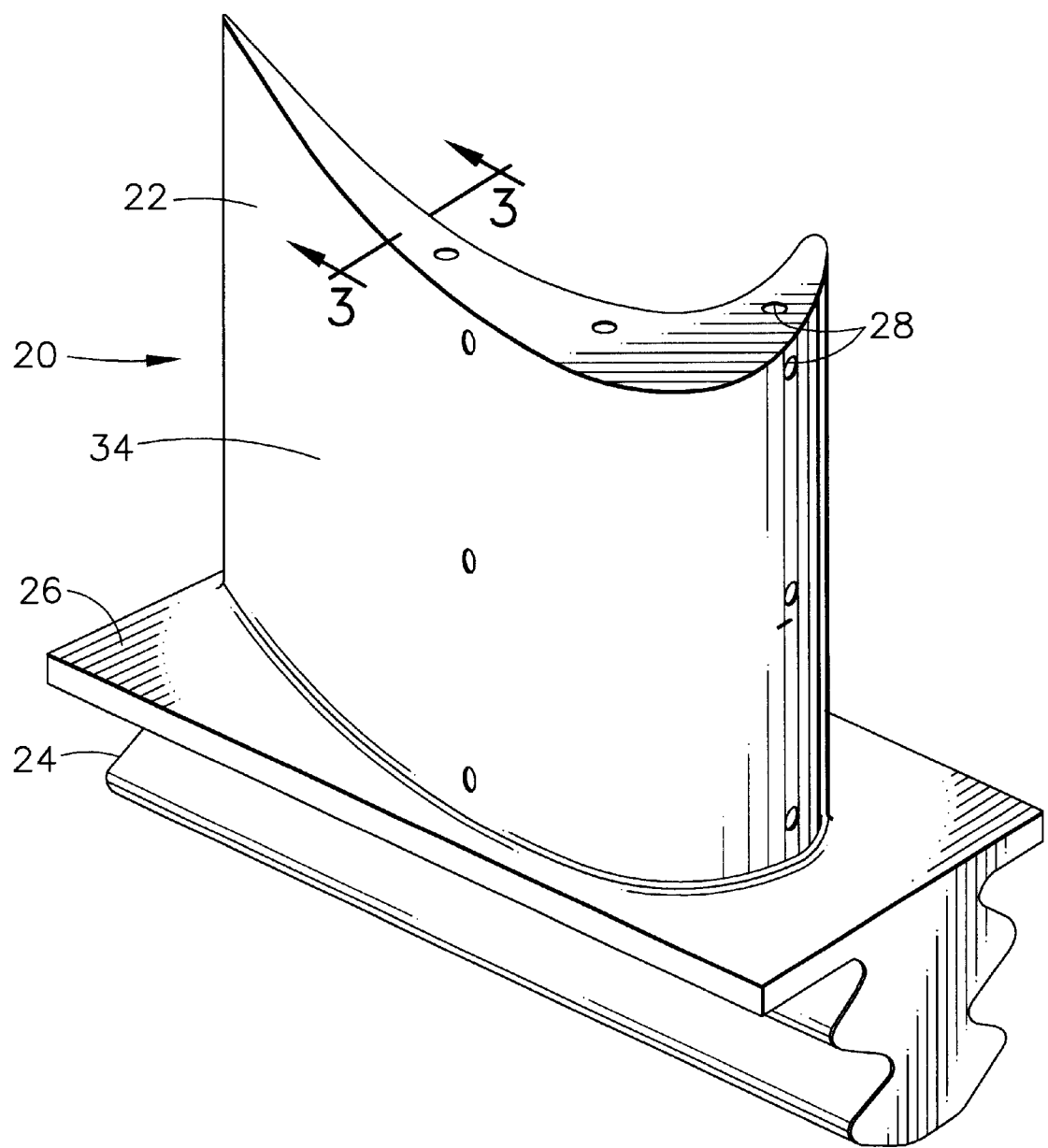
FIG. 1 is a perspective view of a turbine blade.

FIG. 1 depicts a gas turbine engine component such as a turbine blade or turbine vane, and in this illustration a turbine blade 20. The turbine blade 20 is formed of a nickel-base superalloy. The turbine blade 20 includes an airfoil 22 against which the flow of hot exhaust gas is directed. (The turbine vane has a similar appearance in respect to the pertinent portions.) The turbine blade 20 is mounted to a turbine disk (not shown) by a dovetail 24 which extends downwardly from the airfoil 22 and engages a slot on the turbine disk. A platform 26 extends laterally outwardly from the area where the airfoil 22 is joined to the dovetail 24. A number of internal passages extend through the interior of the airfoil 22, ending in openings 28 in the surface of the airfoil 22. A flow of cooling air is directed through the internal passages, to reduce the temperature of the airfoil 22. A thermal barrier coating 34 is applied to at least some portions of the airfoil 22.

Figure 2:
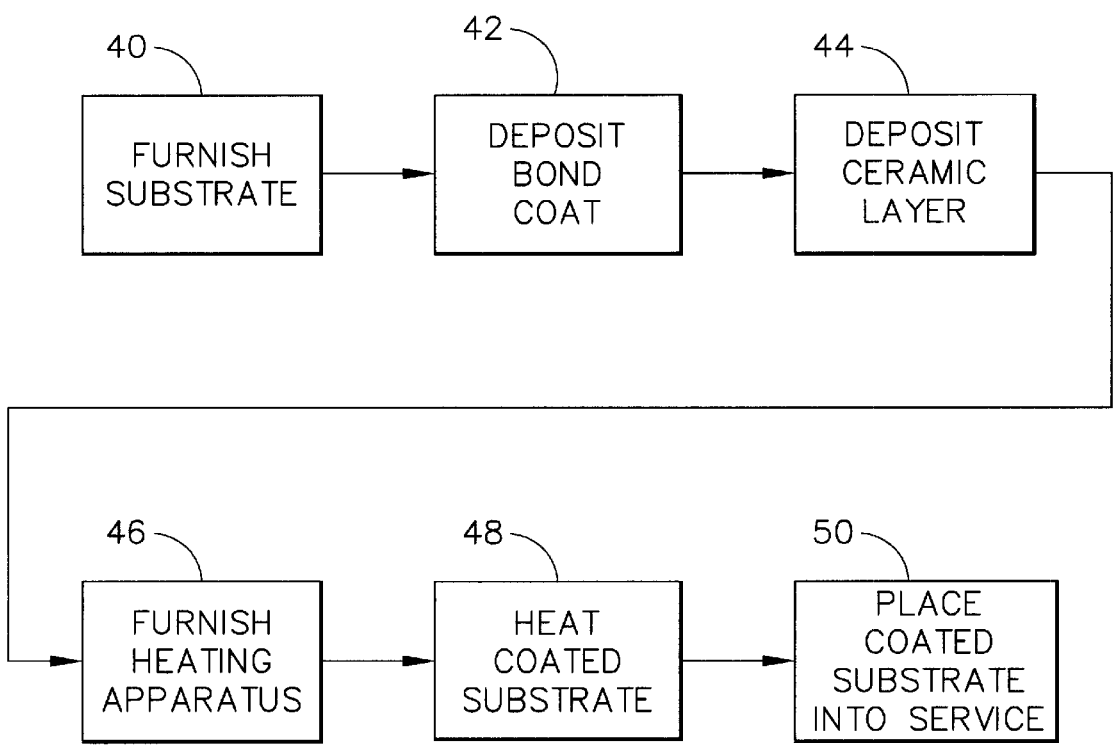
FIG. 2 is a block flow diagram of an approach for preparing a coated gas turbine airfoil.
Figure 3:
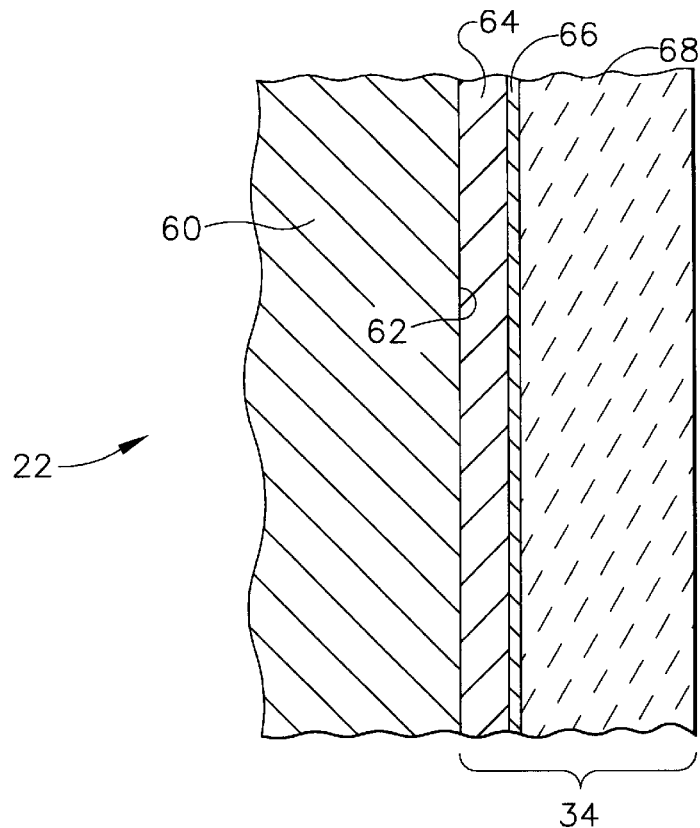
FIG. 3 is an enlarged schematic sectional view through the turbine blade of FIG. 1, taken on lines 3—3, after the deposition of the ceramic layer.

FIG. 2 illustrates a process for making the component article 20 having the thermal barrier coating 34 thereon, and FIG. 3 illustrates the coated article at an intermediate stage of preparation. An article substrate is provided, numeral 40. The article substrate is preferably the airfoil 22 of FIG. 1, either as part of a turbine blade or turbine vane that serves as a substrate 60. The airfoil (and all of the turbine blade or turbine vane) may be made of any operable base-metal alloy material, with a nickel-base superalloy being preferred. As used herein, "nickel-base" means that the composition has more nickel present than any other element. The nickel-base superalloys are typically of a composition that is strengthened by the precipitation of gamma-prime phase. The preferred nickel-base alloy has a composition, in weight percent, of from about 4 to about 20 percent cobalt, from about 1 to about 10 percent chromium, from about 5 to about 7 percent aluminum, from 0 to about 2 percent molybdenum, from about 3 to about 8 percent tungsten, from about 4 to about 12 percent tantalum, from 0 to about 2 percent titanium, from 0 to about 8 percent rhenium, from 0 to about 6 percent ruthenium, from 0 to about 1 percent niobium, from 0 to about 0.1 percent carbon, from 0 to about 0.01 percent boron, from 0 to about 0.1 percent yttrium, from 0 to about 1.5 percent hafnium, balance nickel and incidental impurities.

A most preferred alloy composition is Rene' N5, which has a nominal composition in weight percent of about 7.5 percent cobalt, about 7 percent chromium, about 6.2 percent aluminum, about 6.5 percent tantalum, about 5 percent tungsten, about 1.5 percent molybdenum, about 3 percent rhenium, about 0.05 percent carbon, about 0.004 percent boron, about 0.15 percent hafnium, up to about 0.01 percent yttrium, balance nickel and incidental impurities. Other operable superalloys include, for example, Rene' N6, which has a nominal composition in weight percent of about 12.5 percent cobalt, about 4.2 percent chromium, about 1.4 percent molybdenum, about 5.75 percent tungsten, about 5.4 percent rhenium, about 7.2 percent tantalum, about 5.75 percent aluminum, about 0.15 percent hafnium, about 0.05 percent carbon, about 0.004 percent boron, about 0.01 percent yttrium, balance nickel and incidental impurities; CMSX-4, which has a nominal composition in weight percent of about 9.60 percent cobalt, about 6.6 percent chromium, about 0.60 percent molybdenum, about 6.4 percent tungsten, about 3.0 percent rhenium, about 6.5 percent tantalum, about 5.6 percent aluminum, about 1.0 percent titanium, about 0.10 percent hafnium, balance nickel and incidental impurities; CMSX-10, which has a nominal composition in weight percent of about 7.00 percent cobalt, about 2.65 percent chromium, about 0.60 percent molybdenum, about 6.40 percent tungsten, about 5.50 percent rhenium, about 7.5. percent tantalum, about 5.80 percent aluminum, about 0.80 percent titanium, about 0.06 percent hafnium, about 0.4 percent niobium, balance nickel and incidental impurities; PWA1480, which has a nominal composition in weight percent of about 5.00 percent cobalt, about 10.0 percent chromium, about 4.00 percent tungsten, about 12.0 percent tantalum, about 5.00 percent aluminum, about 1.5 percent titanium, balance nickel and incidental impurities; PWA1484, which has a nominal composition in weight percent of about 10.00 percent cobalt, about 5.00 percent chromium, about 2.00 percent molybdenum, about 6.00 percent tungsten, about 3.00 percent rhenium, about 8.70 percent tantalum, about 5.60 percent aluminum, about 0.10 percent hafnium, balance nickel and incidental impurities; and MX-4, which has a nominal composition as set forth in U.S. Pat. No. 5,482,789, in weight, percent, of from about 0.4 to about 6.5 percent ruthenium, from about 4.5 to about 5.75 percent rhenium, from about 5.8 to about 10.7 percent tantalum, from about 4.25 to about 17.0 percent cobalt, from 0 to about 0.05 percent hafnium, from 0 to about 0.06 percent carbon, from 0 to about 0.01 percent boron, from 0 to about 0.02 percent yttrium, from about 0.9 to about 2.0 percent molybdenum, from about 1.25 to about 6.0 percent chromium, from 0 to about 1.0 percent niobium, from about 5.0 to about 6.6 percent aluminum, from 0 to about 1.0 percent titanium, from about 3.0 to about 7.5 percent tungsten, and wherein the sum of molybdenum plus chromium plus niobium is from about 2.15 to about 9.0 percent, and wherein the sum of aluminum plus titanium plus tungsten is from about 8.0 to about 15.1 percent, balance nickel and incidental impurities. The use of the present invention is not limited to these preferred alloys, and has broader applicability.

A bond coat layer 64 is deposited overlying and contacting a surface 62 of the substrate 60, numeral 42. The bond coat layer 64 may be of any operable type, and is preferably either a diffusion aluminide or an overlay coating. The diffusion aluminide is formed by depositing a coating comprising aluminum and optionally one or more modifying elements onto the surface 62. The diffusion aluminide bond coat layer 64 is deposited by first depositing aluminum and the modifying elements onto the surface 62, by any operable technique. One such technique is vapor phase aluminiding, where a source of a flowable precursor coating material is provided. The source of aluminum is preferably a gaseous source. A mixture of an aluminum-containing material (preferably aluminum metal, aluminum alloy, or aluminum-containing compound), a source of the modifying element, and a halide activator, preferably aluminum chloride, aluminum fluoride, or ammonium fluoride, is placed into a source chamber. The source of the modifying element is preferably an elemental powder containing the modifying element, or a decomposable compound containing the modifying element. The activators and the halide gas containing the modifying elements contact the aluminum-containing material and the source of the modifying element to form the corresponding halide gas. Argon or hydrogen gas is flowed through the source chamber, providing a carrier for the gaseous source of aluminum and the modifying element. The gas mixture is flowed over the surface 62, depositing the aluminum and the optional modifying elements thereon. The source is typically heated to a deposition reaction temperature of from about 1800° F. to about 2100° F. so that deposited aluminum atoms and atoms of the modifying elements interdiffuse into the substrate 60. The bond coat layer is preferably from about 0.0005 to about 0.005 inch thick. As an example, a coating of aluminum and the modifying elements about 0.002 inch thick may be deposited in about 4–8 hours using this approach. Optionally, the heating may be continued after the flow of the source gas is discontinued, to achieve further interdiffusion. Other operable approaches may be employed for introducing the aluminum onto the surface 62. Examples include chemical vapor deposition, slurry-coating processes, foam coating, organo-metallic chemical vapor deposition, pack cementation, and above-the-pack aluminiding.

The bond coat layer 64 may instead be a diffusion platinum aluminide. To deposit such a bond coat layer, a layer of a noble metal, which may be platinum or other noble metal such as palladium is deposited onto the surface 62 of the substrate 60. The deposition is preferably accomplished by placing a platinum-containing solution into a deposition tank and depositing platinum from the solution onto the substrate 60, which is the airfoil 22. An operable platinum-containing aqueous solution is $Pt(NH_3)_4HPO_4$ having a concentration of about 4–20 grams per liter of platinum, and the voltage/current source is operated at about ½–10 amperes per square foot of facing article surface. The platinum layer about 5 micrometers thick is deposited in 1–4 hours at a temperature of 190–200° F. After the platinum layer is deposited, an aluminum-containing layer is deposited overlying the platinum layer in the manner described above for the aluminide coating. The heating associated with the deposition of the aluminum-containing layer causes the substrate, the platinum layer, and the aluminum-containing layer to at least partially interdiffuse with each other, forming a diffusion platinum aluminide.

The surface 62 may instead be coated with an overlay bond coat layer 64 such as the MCrAlX or modified beta phase NiAl coating. The terminology "MCrAlX" is a shorthand term of art for a variety of families of overlay bond coat layers 64. In this and other forms, M refers to nickel, cobalt, iron, and combinations thereof. In some of these protective coatings, the chromium may be omitted. The X denotes elements such as hafnium, zirconium, yttrium, tantalum, rhenium, platinum, silicon, titanium, boron, carbon, and combinations thereof. Specific compositions are known in the art. These elements are incorporated as modifying elements into the bond coat layer 64. The MCrAlX bond coat layer 64 is preferably from about 0.0005 to about 0.005 inch thick, most preferably about 0.002 inch thick. The MCrAlX or modified beta phase NiAl overlay bond coat layer 64 is deposited by any operable physical vapor deposition technique, such as sputtering, cathodic arc, electron beam, or plasma spray.

The bond coat layer 64 has a surface that is oxidized, typically during the fabrication processes, to produce a thin alumina layer 66 about 0.5 to about 3 micrometers thick. This layer 66 is typically removed prior to the deposition of the overlying ceramic layer.

A ceramic layer 68 is deposited overlying and contacting the bond coat layer 64, numeral 44. Prior to deposition of the ceramic layer 68, the surface of the deposited bond coat layer 64 is typically processed to remove any oxides present (such as the layer 66) and to roughen the surface to better adhere with the ceramic. Conveniently, the surface may be processed by grit blasting. The ceramic layer 68 is preferably from about 0.003 to about 0.010 inch thick, most preferably about 0.005 inch thick. (FIG. 3 is not drawn to scale.) The ceramic layer 68 is preferably yttria-stabilized zirconia, which is zirconium oxide containing from about 2 to about 12 weight percent, preferably from about 4 to about 8 weight percent, of yttrium oxide. Other operable ceramic materials may be used as well. The ceramic layer 68 may be deposited by any operable technique, such as physical vapor deposition or plasma spray. The substrate and bond coat thereon are typically heated to a temperature of from about 1800° F. to about 1900° F. during the deposition step 44.

The processing of steps 42 and 44 produces some oxidation of the surface of the bond coat layer 64 in the form of the layer 66. However, this oxidation does not result in the desirable alumina layer on the bond coat layer. The surface oxidation resulting from step 42 is intentionally removed prior to the ceramic deposition step 44, so that the oxide layer 66 resulting from step 42 is not present between the layers 64 and 68 in the final article. During the ceramic deposition step 44, the article is normally at elevated temperature for a short duration of only about 10 minutes or so, so that the combination of temperature and time-at-temperature results in insufficient oxidation to produce the layer of primarily alpha alumina required for the present purposes.

The result of these processing steps 40, 42, and 44 is a coated substrate.

A heating apparatus is furnished, numeral 46. This apparatus is preferably a furnace or oven. The heating apparatus utilizes an oxidizing atmosphere, such as air, at any pressure such as atmospheric pressure, a partial vacuum, or a positive pressure. Preferably, the heating apparatus utilizes a partial pressure of oxygen of from about $10^{31\ 3}$ torr to about $10^{-5}$ torr, most preferably about $10^{-4}$ torr. This partial pressure is most easily accomplished by providing the heating apparatus as a vacuum furnace, and evacuating it to the desired partial pressure of oxygen. The heating apparatus is typically a resistance or induction heated furnace.

Figure 4:
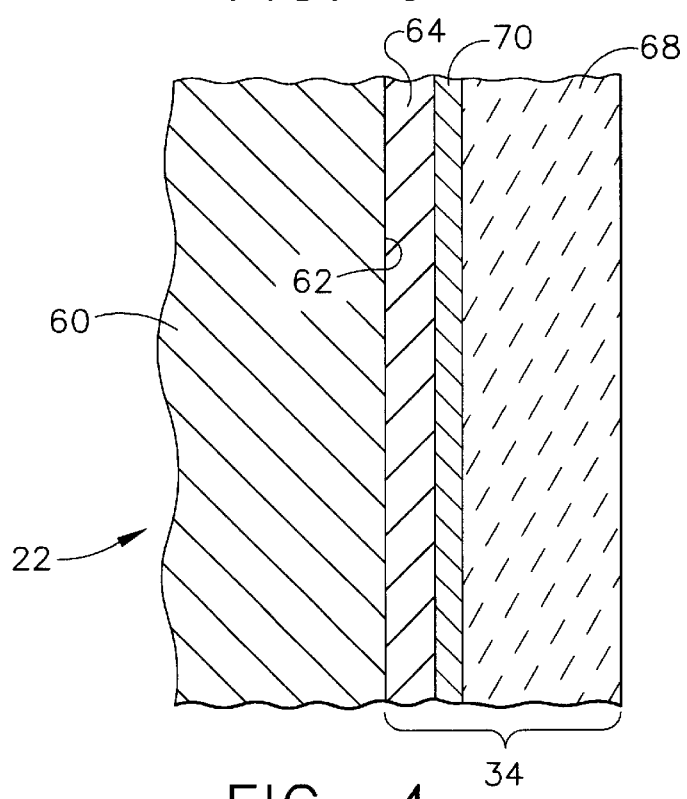
FIG. 4 is an enlarged schematic sectional view through the turbine blade of FIG. 1, taken on lines 3—3, after the deposition of the ceramic layer and after the post-deposition oxidation heat treatment.

The coated substrate is heated, numeral 48, in the heating apparatus to a temperature sufficient to grow a layer 70 of alpha alumina on the bond coat layer 64, between the bond coat layer 64 and the ceramic layer 68, as shown in FIG. 4. This heating step 48 is separate from, and occurs after, completion of the steps 42 and 44. The coated substrate is heated to a temperature of from about 1850° F. to about 2100° F., most preferably from about 1950° F. to about 2100° F. The coated substrate is heated for a time of at least about 30 minutes, preferably from about 30 minutes to about 12 hours, and most preferably from about 5 hours to about 10 hours. If the time is less than about 30 minutes, an insufficient thickness of the alpha alumina layer 70 is formed. If the time is more than about 12 hours, there is no further benefit on the properties of the alumina layer 70 and there may be adverse effects on the properties of the substrate and the other layers. A most preferred heating step utilizes a temperature of about 2000° F. and a time of about 10 hours.

The heating step 48 is preferably accomplished with the coated substrate in a partial pressure of oxygen of from about $10^{-3}$ torr to about $10^{-5}$ torr partial pressure of oxygen, most preferably about $10^{-4}$ torr. This lowered pressure of oxygen provides a relatively slow formation of the desired alpha alumina layer 70. The layer 70 is well defined and of uniform thickness and homogeneous alpha alumina composition.

The result is the thermally grown alpha alumina layer 70, which is preferably from about 0.3 micrometers to about 3 micrometers thick. The layer 70 is predominantly alpha alumina, with more than about 80 percent by volume of the layer 70 being alpha alumina. Preferably, the layer 70 is entirely alpha alumina. This layer 70 protects the bond coat layer 64, and thence the substrate 60, against oxidation and corrosion attack by the environment of the hot combustion gases that impinge against the coated component during service.

This structure of the layer 70 is critical. The alpha-phase form of alumina is the most stable form. If other forms of alumina were present, they would be thermodynamically unstable and would tend to transform to the alpha form at temperatures above about 1850° F. That transformation to the alpha form is accompanied by a volume change of as much as about 7–8 percent, depending upon the initial form of the alumina. The change in volume during the transformation creates internal stresses that may cause the alumina layer and the adjacent ceramic layer to crack and spall prematurely, thereby shortening the life of the thermal barrier coating and the coated article.

This present approach to producing a uniform, controlled alpha alumina layer 70 is to be contrasted with the conventional approaches for oxidizing the bond coat layer. Although prior approaches often refer to forming an alumina scale or the like on the bond coat, this alumina scale is not expected to be of the same quality or character as the present alumina layer 70. The significance of these differences was not previously appreciated, and therefore no mention is made of them in the art. In these conventional approaches, the bond coat layer is oxidized under the conditions of the deposition of the bond coat layer or the conditions of the deposition of the ceramic layer, or even after the article is placed into service. These prior deposition conditions are not controlled as to temperature, gas pressure, and time. The prior deposition approach may also be accomplished in a relatively contaminated atmosphere, so that the oxidation is accomplished in a contaminated atmosphere. The result is an oxide scale on the bond coat that may be of inhomogeneous composition and may contain forms of alumina other than alpha alumina. Additionally, in conventional processing the oxide formed during deposition of the bond coat is removed prior to deposition of the ceramic layer.

The processed component is thereafter optionally placed into service, numeral 50, typically by installing it into a turbine disk of a jet engine and then operating the jet engine. The step 48 is completed prior to commencing the step 50. Any further oxidation in service is not part of the step 48, although in-service oxidation may result in further thickening of the layer 70. "Service" is the use of the article in its service environment, as distinct from the preparation process described above.

To demonstrate the approach of the present invention, button specimens were prepared for furnace cycle testing (FCT). The substrate alloy was Rene N5. Each specimen was coated with a platinum aluminide bond coat layer 64 and a yttria-stabilized zirconia ceramic layer 68. Some specimens were tested without further oxidation treatment, and others were given the heat treatment of step 48. Furnace cycle testing included cycling the specimens by heating from room temperature to 2125° F. in about 5 minutes, holding at 2125° F. for about 50 minutes, and cooling to room temperature in about 5 minutes. The specimens were inspected visually periodically. The life of the specimen was defined as the number of cycles required for about 20 percent of the surface area of the coating to fail by spallation.

Specimens prepared without the oxidation treatment of the invention exhibited an average FCT life of 228 cycles. Specimens prepared with the oxidation treatment of the invention exhibited an average FCT life of 273 cycles. A subset of specimens prepared using a most preferred oxidation treatment according to the invention of 2000° F. for 10 hours exhibited an average FCT life of 340 cycles.

Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. A method for preparing a nickel-base superalloy article protected by a thermal barrier coating, comprising the steps of furnishing a substrate made of a nickel-base superalloy; thereafter depositing a bond coat layer overlying and contacting the substrate; thereafter removing any oxide formed on the bond coat layer; thereafter depositing a ceramic layer overlying and contacting the bond coat layer, thereby forming a coated substrate; thereafter placing the coated substrate into a heating apparatus operating with an oxidizing atmosphere and an oxygen partial pressure; and thereafter heating the coated substrate in the heating apparatus to a temperature of from about 1850° F. to about 2100° F., for a time of at least about 30 minutes to form a final article; and thereafter placing the final article into service in a jet engine.

2. The method of claim 1, wherein the bond coat layer is a diffusion aluminide.

3. The method of claim 1, wherein the bond coat layer is an overlay coating.

4. The method of claim 1, wherein the ceramic layer comprises yttria stabilized zirconia.

5. The method of claim 1, wherein the duration of the step of heating is from about 30 minutes to about 12 hours.

6. The method of claim 1, wherein the step of placing includes the step of placing the coated substrate into the heating apparatus operating with the oxygen partial pressure of from about $10^{-3}$ torr to about $10^{-5}$ torr.

7. The method of claim 1, wherein the step of heating includes the step of growing a layer comprising primarily alpha alumina between the bond coat layer and the ceramic layer.

8. The method of claim 1, wherein the step of removing any oxide formed includes the step of roughening the bond coat.

9. A method for preparing a nickel-base superalloy article protected by a thermal barrier coating, comprising the steps of furnishing a substrate made of a nickel-base superalloy; thereafter depositing a bond coat layer overlying and contacting the substrate; thereafter removing any oxide formed on the bond coat layer; thereafter depositing a ceramic layer overlying and contacting the bond coat layer, thereby forming a coated substrate; thereafter placing the coated substrate into a heating apparatus operating with an oxidizing atmosphere; and thereafter heating the coated substrate in the heating apparatus to a temperature of from about 1850° F. to about 2100° F. and a partial pressure of oxygen of from about $10^{-3}$ torr to about $10^{-5}$ torr, for a time of at least about 30 minutes to form a final article.

10. The method of claim 9, wherein the step of removing any oxide formed includes the step of roughening the bond coat.

11. A method for preparing a nickel-base superalloy article protected by a thermal barrier coating, comprising the steps of furnishing a coated substrate comprising
  a substrate made of a nickel-base superalloy,
  a bond coat layer overlying and contacting the substrate, and
  a ceramic layer overlying and contacting the bond coat layer, wherein the step of furnishing includes the step of removing any oxide that would otherwise be present between the bond coat layer and the ceramic layer; thereafter placing the coated substrate into a heating apparatus; and thereafter heating the coated substrate in the heating apparatus to a temperature sufficient to grow a layer comprising primarily alpha alumina between the bond coat layer and the ceramic layer, to produce a final article.

12. The method of claim 11, wherein the step of heating includes the step of heating the coated substrate to a temperature of from about 1850° F. to about 2100° F., for a time of at least about 30 minutes.

13. The method of claim 11, wherein the bond coat layer is a diffusion aluminide.

14. The method of claim 11, wherein the bond coat layer is an overlay coating.

15. The method of claim 11, wherein the ceramic layer comprises yttria stabilized zirconia.

16. The method of claim 11, wherein the time of the step of heating lasts from about 30 minutes to about 12 hours.

17. The method of claim 11, wherein the step of heating includes the step of heating the coated substrate in a partial pressure of oxygen.

18. The method of claim 11, wherein the step of heating includes the step of heating the coated substrate in a partial pressure of oxygen of from about $10^{-3}$ torr to about $10^{-5}$ torr.

19. The method of claim 11, including an additional step, commenced after the step of heating is completed, of placing the final article into service in a jet engine.

20. The method of claim 11, wherein the step of removing any oxide formed includes the step of roughening the bond coat.

* * * * *